(12) United States Patent
Manor et al.

(10) Patent No.: US 10,789,292 B2
(45) Date of Patent: Sep. 29, 2020

(54) SYSTEM AND METHOD FOR ENRICHING DATA AND SUPPORTING DATA ANALYSIS IN A HYBRID ENVIRONMENT

(71) Applicant: VISUAL PROCESS LIMITED, Bnei Zion (IL)

(72) Inventors: Raanan Manor, Haifa (IL); Chen Linchevski, Bnei Zion (IL)

(73) Assignee: Precognize Ltd., Tirat Hacarmel (IL)

( * ) Notice: Subject to any disclaimer, the term of this patent is extended or adjusted under 35 U.S.C. 154(b) by 388 days.

(21) Appl. No.: 13/947,230

(22) Filed: Jul. 22, 2013

(65) Prior Publication Data
US 2015/0026219 A1 Jan. 22, 2015
US 2018/0357327 A9 Dec. 13, 2018

Related U.S. Application Data

(60) Provisional application No. 61/674,481, filed on Jul. 23, 2012.

(51) Int. Cl.
*G06F 16/901* (2019.01)
(52) U.S. Cl.
CPC .................. *G06F 16/901* (2019.01)
(58) Field of Classification Search
CPC ......... G06F 17/30289; G06F 17/30294; G06F 16/901
USPC ........................................................ 707/803
See application file for complete search history.

(56) References Cited

U.S. PATENT DOCUMENTS

| | | | | |
|---|---|---|---|---|
| 5,903,478 A | * | 5/1999 | Fintel | G06F 9/451 703/6 |
| 6,643,555 B1 | * | 11/2003 | Eller | G05B 19/0426 700/17 |
| 6,957,177 B1 | * | 10/2005 | Brumitt | G06F 16/00 703/13 |
| 7,739,671 B1 | * | 6/2010 | Hinchey | G06F 8/10 717/136 |
| 8,108,193 B2 | * | 1/2012 | Chu | G06F 17/5009 703/13 |

(Continued)

OTHER PUBLICATIONS

Reinhartz-Berger, I., & Dori, D. (2004). Object-Process Methodology (OPM) vs. UML—a Code Generation Perspective. CAiSE Workshops.

(Continued)

*Primary Examiner* — Pierre M Vital
*Assistant Examiner* — Nargis Sultana
(74) *Attorney, Agent, or Firm* — Reuven K. Mouallem; FlashPoint IP Ltd.

(57) ABSTRACT

The present invention provides a computer-implemented system and method for rapid capturing of the physical environment in a formal manner and connecting this formal representation to the data held in an organization's databases. The present invention includes a computer implemented system and method for accurate extraction of the "reality" into a formal model. In addition, the invention includes methods to divide the information by different aspects based on user defined and automatic tagging. The invention utilizes a modeling language to create a model, which includes a plurality of entities, to describe a physical environment and linking a plurality of external data associated with the physical environment with the plurality of entities.

7 Claims, 3 Drawing Sheets

(56) References Cited

U.S. PATENT DOCUMENTS

| | | | | |
|---|---|---|---|---|
| 8,571,803 | B2* | 10/2013 | Hill | G16B 5/00 702/19 |
| 8,583,701 | B2* | 11/2013 | Werner | G06F 16/36 707/803 |
| 2002/0038206 | A1* | 3/2002 | Dori | G06Q 10/101 703/22 |
| 2003/0046130 | A1* | 3/2003 | Golightly | G06Q 30/0202 705/7.24 |
| 2004/0143470 | A1* | 7/2004 | Myrick | G06Q 30/0205 705/7.36 |
| 2005/0010117 | A1* | 1/2005 | Agutter | A61B 5/00 600/484 |
| 2005/0091093 | A1* | 4/2005 | Bhaskaran | G06Q 10/0637 705/7.36 |
| 2005/0267771 | A1* | 12/2005 | Biondi | G06Q 10/06 705/7.36 |
| 2006/0100797 | A1* | 5/2006 | Poorman | G05B 23/0267 702/56 |
| 2006/0271581 | A1* | 11/2006 | Sanjar | G06F 40/14 |
| 2007/0150330 | A1* | 6/2007 | McGoveran | G06Q 30/0201 705/7.13 |
| 2007/0157159 | A1* | 7/2007 | Fildebrandt | G06F 8/10 717/104 |
| 2007/0250549 | A1* | 10/2007 | Meyer | G06F 8/71 |
| 2007/0265866 | A1* | 11/2007 | Fehling | H04L 67/22 340/506 |
| 2008/0033661 | A1* | 2/2008 | Syroid | G16H 50/50 702/22 |
| 2008/0127052 | A1* | 5/2008 | Rostoker | G06F 8/34 717/105 |
| 2008/0201325 | A1* | 8/2008 | Doniger | A61P 3/10 |
| 2009/0063559 | A1* | 3/2009 | Rhodes | G06F 16/258 |
| 2009/0172773 | A1* | 7/2009 | Moore | G06F 19/325 726/1 |
| 2010/0057415 | A1* | 3/2010 | Chu | G06Q 10/06 703/6 |
| 2010/0114628 | A1* | 5/2010 | Adler | G06Q 10/063 705/7.11 |
| 2010/0312739 | A1* | 12/2010 | Ramic | G06N 3/006 706/47 |
| 2011/0099254 | A1* | 4/2011 | Vankadara | G06Q 10/107 709/221 |
| 2012/0054249 | A1* | 3/2012 | Batra | G06F 16/283 707/803 |
| 2012/0246105 | A1* | 9/2012 | James | G16H 70/00 706/47 |
| 2012/0310612 | A1* | 12/2012 | Martinez | G06F 16/211 703/6 |
| 2013/0204669 | A1* | 8/2013 | Percy | G06F 16/9537 705/7.34 |
| 2014/0280142 | A1* | 9/2014 | Wasson | G06F 16/2465 707/737 |
| 2015/0134704 | A1* | 5/2015 | Wallis | G06F 16/901 707/803 |

OTHER PUBLICATIONS

"OPM vs. SysML and UML" sub-section from "Object Process Methodology," Wikipedia—The Free Encyclopedia.
G. Engels, A. Forster, R. Heckel, and S. Thone, "Process Modeling Using UML", in Process-Aware Information Systems, Ed. by Dumas, van der Aalst, and ter Hofstede.
(Continued) John Wiley & Sons, Inc. (2005), pp. 85-117.

* cited by examiner

SYSTEM AND METHOD FOR ENRICHING DATA AND SUPPORTING DATA ANALYSIS IN A HYBRID ENVIRONMENT

CROSS REFERENCE TO RELATED APPLICATIONS

This application claims the benefit of U.S. provisional patent application No. 61/674,481 filed on 23 Jul. 2013 and incorporated by reference as if set forth herein.

FIELD OF THE INVENTION

The present invention relates to data analysis and database management.

BACKGROUND OF THE INVENTION

In many environments, physical events are not necessarily captured and expressed in the data gathered in the organization's databases. Failure to incorporate the functionality, structure and behavior within an organization as an integral part of the organizations databases may result in incorrect or partial analysis of the data.

Therefore, a need exists to accurately and comprehensively capture the physical environment in a formal manner and connecting this formal representation to the data held in an organization's databases.

BRIEF DESCRIPTION OF THE DRAWINGS

The present invention will be understood and appreciated more fully from the following description taken in conjunction with the appended drawings in which.

SUMMARY OF THE INVENTION

Figure 1:
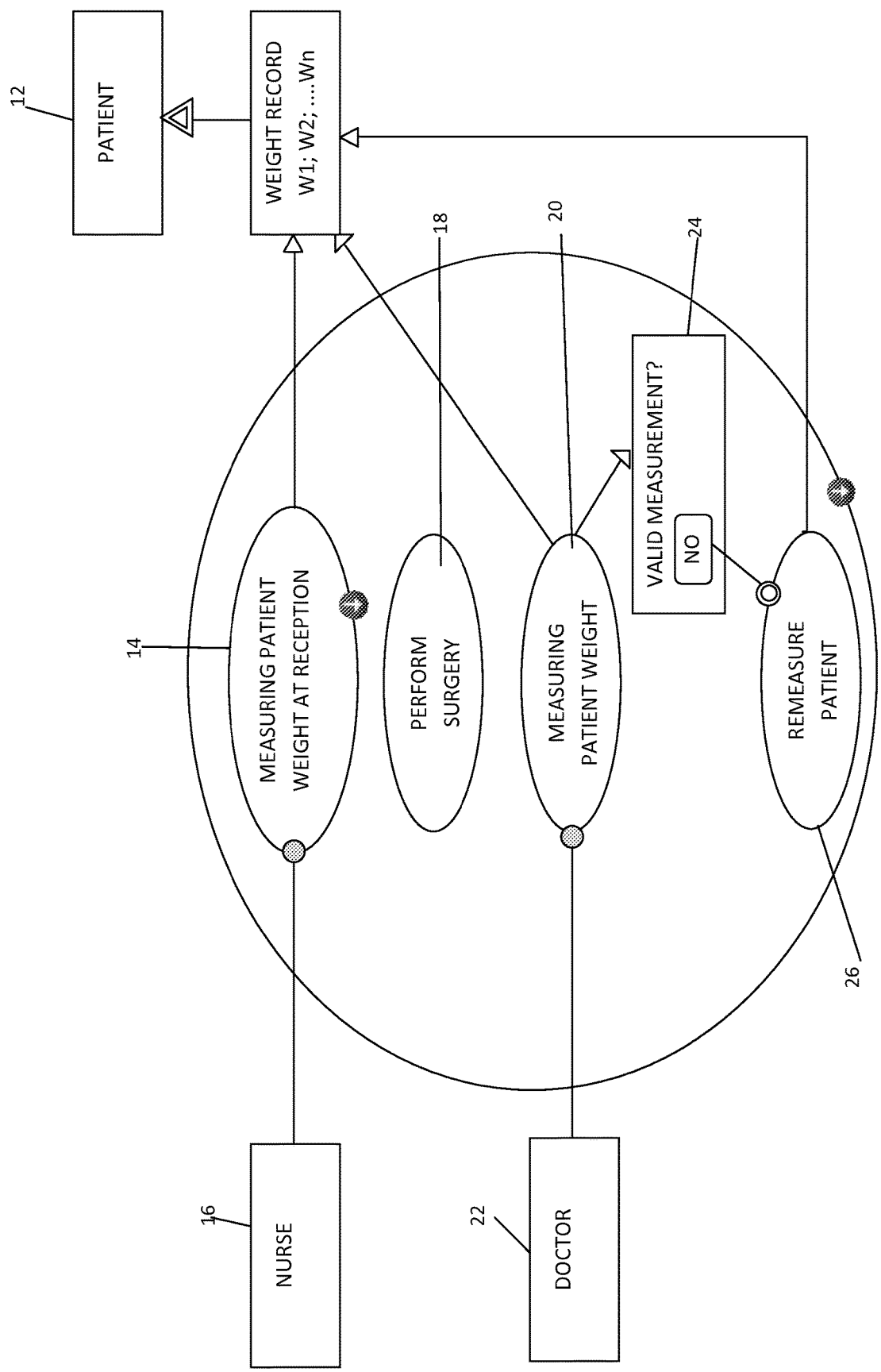
FIG. 1 is a schematic illustration of a model describing an exemplary physical environment and the method of collecting data for an organization's databases, constructed and operative in accordance an embodiment of the invention.

The present invention provides a system and a computer-implemented method for rapid capturing of the physical environment in a formal manner and connecting this formal representation to the data held in an organization's databases. The present invention includes a computer implemented method for accurate extraction of the "reality" into a formal model. In addition, the invention includes computer implemented methods to divide the information by different aspects based on user defined and automatic tagging The present invention also provides means to link the knowledge holder and the knowledge consumers, and further find relevant data based on sophisticated semantics which are based on the model.

A database is created which captures the actual physical events and behavior of an organization, this database consists of model entities and the relations between those entities. The database also holds any additional information which is collected during the database creation. The present invention provides methods to search, extract and connect external data to the knowledge kept in the created database.

By connecting the created database with the external data, it is possible to support accurate data analysis for industrial, Internet or other initiatives.

There is thus provided, in accordance with an embodiment of the invention, a method for enriching data and supporting data analysis, which includes the steps of:

utilizing a modeling language to create a model, which the model includes a plurality of entities, to describe a physical environment; and linking a plurality of external data with the plurality of entities; the external data being associated with the physical environment.

Furthermore in accordance with an embodiment of the invention, the plurality of external data includes data related to one of a group including identifiers, databases, images, and data related to the functionality, structure and behavior associated with the model.

Furthermore in accordance with an embodiment of the invention, the physical environment includes any of a group including a process, system, structure, routine, procedure, technique and method.

Furthermore in accordance with an embodiment of the invention, the method further includes the steps of:

analyzing the plurality of external data with the plurality of entities;

creating at least one transformation rule; and transforming at least one data of the plurality of external data in accordance with the at least one transformation rule.

Furthermore in accordance with an embodiment of the invention, the step of creating includes the step of creating algorithms based on an analysis of the model entities.

Furthermore in accordance with an embodiment of the invention, the step of creating includes the step of visually examining the model and manually enriching the plurality of external data.

Furthermore in accordance with an embodiment of the invention, the method further includes the steps of:

creating a plurality of tags, each tag associated with a different aspect of the model; and tagging entities with the created tags.

In addition, there is also provided a system for enriching data and supporting data analysis. The system includes one or more processors to create a model, that includes a plurality of entities, to describe a physical environment, and to link a plurality of external data, associated with the physical environment with the plurality of entities.

DESCRIPTION OF THE INVENTION

This present invention relates to the analysis and management of data stored within a database.

In an embodiment of the invention, a model is created using Object Process Methodology (OPM), though it will be appreciated by persons knowledgeable in the art, that any modeling language such as Unified Modeling Language (UML) and Systems Modeling Language (SysML), for example, may be used.

Briefly, OPM is a modeling language that combines a minimal set of building blocks—objects and processes that transform them—with a dual graphic-textual representation in a single diagram type. OPM uses two types of elements: entities and links. Entities are used to express "physical" or "informational" elements which can be inside or outside of the system being modeled, that is, "systemic" or "environmental".

The entities used in OPM are objects, states and processes. The links used in OPM are structural links and procedural links. A structural link forms a relation between two objects and is persistent. A procedural link is used to link a process to an object—in which case it indicates a change in the state of the object—or to another process—in which case it indicates the launching of the second process when the first ends.

Reference is now made to FIG. 1, which is a schematic illustration of a model describing an exemplary physical environment and the method of collecting data for an organization's databases, constructed and operative in accordance an embodiment of the invention. The physical environment may refer to any process, system, structure, routine, procedure, technique and method, for example.

The example of FIG. 1 is a schematic exemplary illustration of a model describing an exemplary process, wherein a patient's weight is measured before and after surgery.

In this case, the patient 12 is measured twice or even three times: before and after the surgery. If the measurement after the surgery is not valid, the patient may be re-measured.

The formal model caters for these facts. First there is a process of "Measuring Patient Weight at Reception" 14 by a nurse 16. This process yields a "Weight Record [W1, W2, Wn]", in the format, say XxxW1, where Xxx refers to the patient name, prior to surgery 18. After surgery is performed, the patient's weight is measured upon release 20, by a doctor 22, for example. This process called "Measuring Patient Weight at Release" yields another "Weight Record" (say XxxW2). According to the model, there is an indication at this point whether the weight (xW2) following surgery is valid or not (query box 24). If it is not valid ("Valid Measurement" state is "no") then the patient is re-measured 26. This process of "Re-measure Patient" yields another "Weight Record" (say XxxW3).

When analyzing the data, the analyst\statistician\business user should ignore the second reading (XxxW2) when the third reading is present, that is, only use the first and third readings. Yet the analyst has no way to know from merely examining the data that the standard practice is to validate the measurement taken at the release and re-measure if the reading is not valid.

The present invention builds a hierarchical model of standard business practice so that a series of rules may be defined based on methodology of the business. Thus, by examining the model shown in the example of FIG. 1, the analyst knows that the second reading (XxxW2—in italics) in Table 1 below is invalid and should be discounted when the third reading is present.

The data collected may be shown in tabular format. Table 1 displays the recorded data appearing in the hospital's database. In this example the data is arranged by patient name and weight.

TABLE 1

| Patient name | Measurement | Weight (kg) | Date |
|---|---|---|---|
| Xxx | W1 | 56 | Jan. 1, 1990 |
| Yyy | W1 | 87 | Feb. 1, 1990 |
| Zzz | W1 | 43 | Mar. 1, 1990 |
| *Xxx* | *W2* | 57 | Feb. 1, 1990 |
| Xxx | W3 | 55 | Mar. 1, 1990 |
| Yyy | W2 | 84 | Apr. 1, 1990 |
| Zzz | W2 | 44 | Jul. 1, 1990 |

As explained above, without knowing the sequence of events, the data analyst cannot take into consideration the circumstances related to each measurement. A large organization such as hospital, industrial shop or utility company, for example, may have thousands of processes such as the one demonstrated in this example.

The present invention allows the data to be correctly analyzed since the created model includes a plurality of entities describing the organization's system. This may also apply in any environment where not all the necessary information may be captured within the organization's database(s).

The present invention provides a computer implemented method to capture all the required data related to the functionality, structure and behavior of the organization, via interviews with the relevant personnel.

Table 2 shows the data captured by an organization's database under "Measurement Data" for several patients. As can be seen patient "Xxx" has three readings. The present invention provides a method and a system which includes rules to differentiate between the readings and be able to ignore the second invalid reading (as explained above).

TABLE 2

| Patient name | Measurement | Weight (kg) | Date |
|---|---|---|---|
| Xxx | W1 | 56 | Jan. 1, 1990 |
| Yyy | W1 | 87 | Feb. 1, 1990 |
| Zzz | W1 | 43 | Mar. 1, 1990 |
| *Xxx* | *W2* | 57 | Feb. 1, 1990 |
| Xxx | W3 | 55 | Mar. 1, 1990 |
| Yyy | W2 | 84 | Apr. 1, 1990 |
| Zzz | W2 | 44 | Jul. 1, 1990 |

TABLE 3

| Patient name | Measurement | Weight (kg) | Date | PEW |
|---|---|---|---|---|
| Xxx | W1 | 56 | Jan. 1, 1990 | 0 * 56 = 0 |
| Yyy | W1 | 87 | Feb. 1, 1990 | 0 * 87 = 0 |
| Zzz | W1 | 43 | Mar. 1, 1990 | 0 * 43 = 0 |
| *Xxx* | *W2* | 57 | Feb. 1, 1990 | 0 * 57 = 0 |
| Xxx | W3 | 55 | Mar. 1, 1990 | 1 * 55 = 55 |
| Yyy | W2 | 84 | Apr. 1, 1990 | 1 * 84 = 84 |
| Zzz | W2 | 44 | Jul. 1, 1990 | 1 * 44 = 44 |

Table 3 shows the results of applying an algorithm generated by the present invention in order to enrich the data (of Table 2) with the knowledge captured by the formal model (FIG. 1).

In the example, the algorithm comprises the following data:

Patient Effective Date (PED)=Latest Patient Date;

Patient Effective Weight (PEW)=(PED==Date? 1:0)*(Patient Date);

Thus, the algorithm takes into account that reading with the latest date should be taken into account—that is the third reading of 3/1/1990—not the second reading of 2/1/1990. This is a simplified example of how present invention may be used. The algorithm may be generated automatically or manually by a person who visually examines the model and adds the conversion rules.

As can be seen in Table 3, the second reading for patient "Xxx" is ignored and PEW is 0:

Table 4 illustrates the filtered results, after the data items having 0 in the "PEW" column is removed:

TABLE 4

| Patient name | Measurement | Weight (kg) | Date | PEW |
|---|---|---|---|---|
| Xxx | W3 | 55 | Mar. 1, 1990 | 1 * 55 = 55 |
| Yyy | W2 | 84 | Apr. 1, 1990 | 1 * 84 = 84 |
| Zzz | W2 | 44 | Jul. 1, 1990 | 1 * 44 = 44 |

Figure 2A:
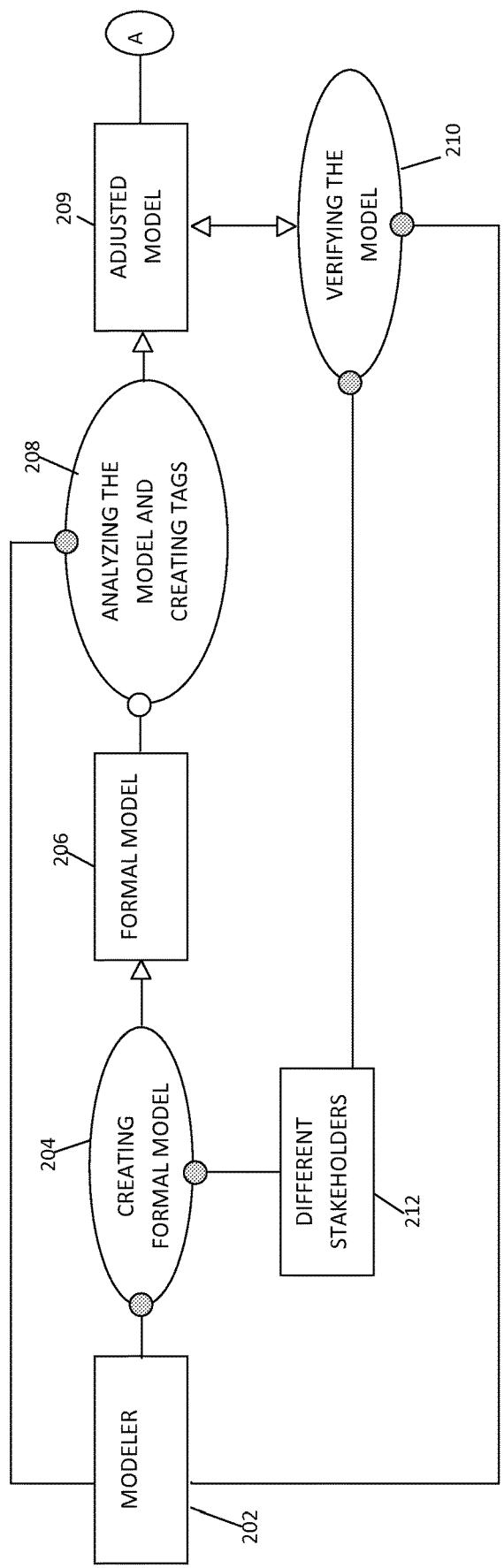
FIG. 2A-2B is a schematic flow chart illustration of the method of creating the model of FIG. 1 and enriching the data within an organization's databases.
Figure 2B:
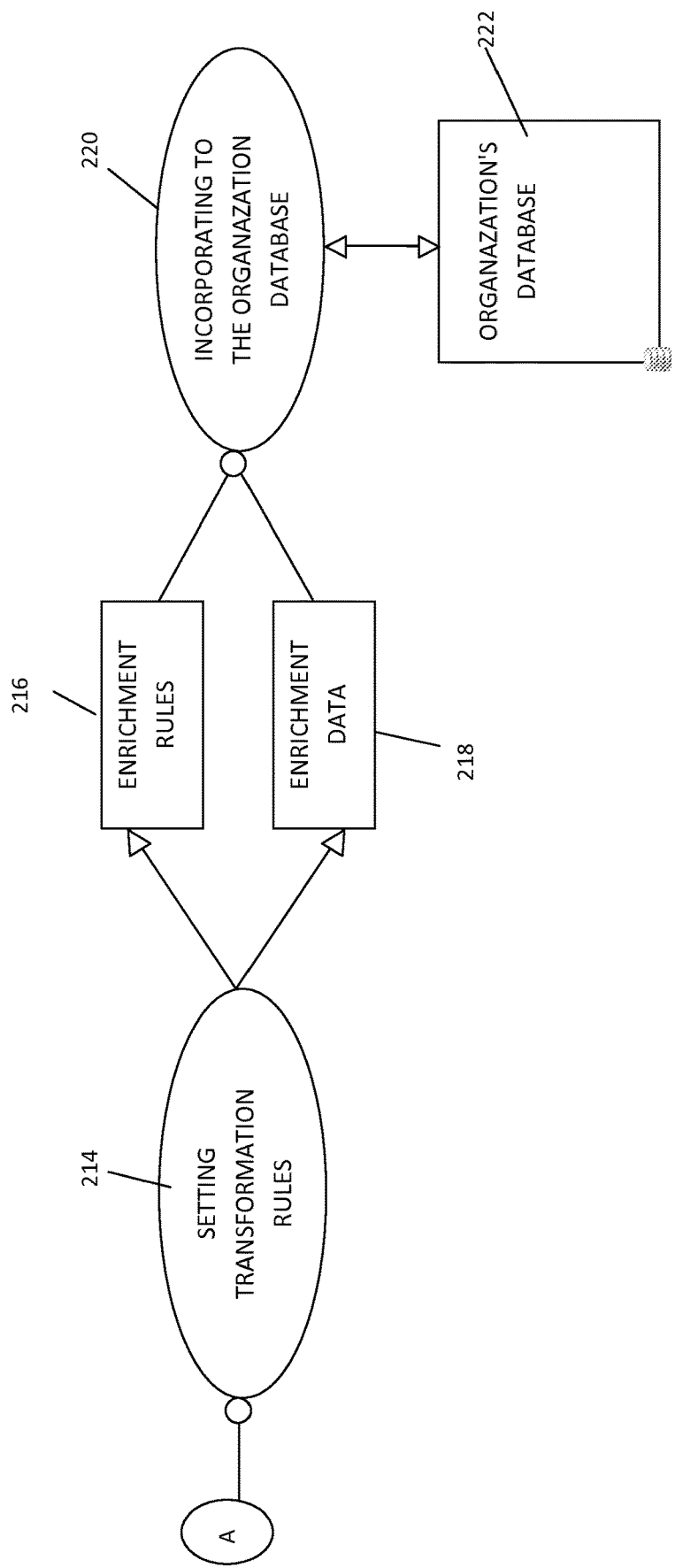

Reference is now made to FIG. 2, which is a schematic flow chart illustration of the method of creating the model and ending at the incorporation of the information into the organization's databases.

Ellipses refer to processes which are undertaken and the rectangles refer to an object (person or data).

The steps of the method maybe summarized as follows:

Step 1: A modeler 202 creates (process 204) a formal model (object 206) that describes the actual process. This may be carried out using any formal visual language, such as OPM, for example.

Step 2: The model is analyzed and, optionally tags created (process 208) that reflect different aspects in the model. Entities in the model may be tagged according to one or more tags. The present invention allows for tagging and aspect conversion.

Step 3: The visual model may be optionally verified (process 210) with the stakeholders 212 and the domain experts to confirm that the model representation of the system is correct using the subject technology. Any change required will be reflected by a repeat of steps 204-208.

Additionally, the model may be verified (process 210) by the modeler 202. Any change required will be reflected by a repeat of steps 204-208.

Step 4: Once the model has been determined, transformation rules are set (process 214) in order to enrich external data associated with the entity. Transformation may be carried out using any of several methods including but not limited to the following:

Outputting the information, collected during the modeling phase and attached to each model entity, in a form that can be merged with the external data in the databases;

Creating rules and algorithms (step 216) to be implemented in the external data and enriching the external data through knowledge gathered in the model (step 218);

Visually examining the model by the analyst and manually enriching the external data.

The transformation step may be achieved by having a lookup between the open entity identifier and the external application internal resource identifier. This may be achieved in any of several ways known in the art In an example, the entities in the model may be tagged and then using visual process API (Application Programming Interface) the identifiers may be exported into a lookup table. Thus, by querying the model, any information related to the entity may be resolved. The application's internal logic may be added to the database knowledge.

Step 5—Finally, the enriched data may be incorporated (process 220) into the organization's database 222.

Non-limiting examples of steps 4 and 5 are as follows:

EXAMPLE 1

Using the model database, organization personal data may be linked to specific parts of the model, thus creating a link between an employee and the actual process or processes the employee is responsible for. Thus, the organization may incorporate the employee's actual day to day time and work records with the employee's personnel data. This allows the organization to search or query the records. For example the organization could access the database to ascertain "experts on "oil change" of a certain machine".

EXAMPLE 2

Using the model database, the organization's data tables and fields may be linked to the location on the factory floor where specific data items are measured or manufactured, for example. This allows the organization to follow the flow of data in the real world (factory floor) into the organization's data warehouse.

After connecting the external data to the model, the database may be queried, for example, as follows:

1 At which locations were "specific data" (such as the production of 5 inch gear wheels, for example) collected?

2 Are all the collecting points collecting the same data?

Prior to the present invention, it would not have been possible for answers to be found to the above queries.

In an embodiment of the method of the present application, OPM logic may be used in order to obtain a list of entities which correspond to that logic. For example in example 1 above, a query such as "List all the Processes which are used by a person X" would result in all of the processes' inputs and outputs being listed.

By having a list of identifiers from the model, an external application GUI (Graphic User Interface) may be utilized to connect external data to the list of identifiers.

In an embodiment of the method of the present application, knowledge mapping may be provided at every level of the organization. For example, users may themselves, as experts, assign images to processes to a certain granular process that was mapped and thereby create a net mapping of the knowledge throughout the organization. For example, a tool operator on the factory floor would be able to describe his work as well as list all other persons with whom he is interacting.

It will be appreciated that the present invention is not limited by what has been described herein above and that numerous modifications, all of which fall within the scope of the present invention, exist. it will be apparent that the invention can be carried into practice with many modifications, variations and adaptations, and with the use of numerous equivalents or alternative solutions that are within the scope of a person skilled in the art, without departing from the spirit of the invention, or the scope of the claims, which follow.

The invention claimed is:

1. A method for enhancing data analysis in a hybrid environment, the method comprising the steps of:
(a) utilizing a visual modeling language to create a computer-embedded visual model describing a physical environment, wherein said computer-embedded visual model, which can be identified as originating from said visual modeling language and is represented by a graphical representation, includes a plurality of entities having at least one real-world process and at least one real-world object related to each other, which are graphically represented in said computer-embedded visual model, wherein said at least one real-world process is at least one procedural link that changes at least one state of said at least one real-world object;

(b) using said computer-embedded visual model, linking a multiplicity of data obtained from databases, wherein said multiplicity of data is detected or measured, from said plurality of entities, in said physical environment, and wherein said computer-embedded visual model can be defined independent of said multiplicity of data;

(c) irrespective of said visual modeling language used to create said computer-embedded visual model, extracting at least one computationally-executable rule from related functionality, related structure, and/or related behavior between at least two said entities, or sub-components thereof in said computer-embedded visual model, wherein said step of extracting is based on said at least one real-world process that relates said at least two entities;

(d) executing said at least one computationally-executable rule for generating and incorporating new data into said databases, wherein said new data are not previously associated with said multiplicity of data within said databases;

(e) based on said computer-embedded visual model, discounting a weighting of invalid data in said databases; and (f) upon receiving a query to said databases for a status of said plurality of entities, producing a status report of said at least one state based on said new data, wherein said status report reflects an actual status of said physical environment, and wherein said status report without said new data is incomplete and/or incorrect.

2. The method of claim 1, wherein said multiplicity of data includes data elements linked to said related functionality, said related structure, and/or said related behavior associated with said computer-embedded visual model selected from the group consisting of: identifiers, databases, images, and data.

3. The method of claim 1, wherein said physical environment is selected from the group consisting of: a process, a system, a structure, a routine, a procedure, a technique, an asset, and a method.

4. A system for enhancing data analysis in a hybrid environment, the system comprising:
   (a) a CPU for performing computational operations;
   (b) a memory module for storing data; and
   (c) an analysis module configured for:
      (i) utilizing a visual modeling language to create a computer-embedded visual model to describe a physical environment, wherein said computer-embedded visual model, which can be identified as originating from said visual modeling language and is represented by a graphical representation, includes a plurality of entities having at least one real-world process and at least one real-world object related to each other, which are graphically represented in said computer-embedded visual model, wherein said at least one real-world process is at least one procedural link that changes at least one state of said at least one real-world object;
      (ii) using said computer-embedded visual model, linking a multiplicity of data obtained from databases, wherein said multiplicity of data is detected or measured, from said plurality of entities, in said physical environment, and wherein said computer-embedded visual model can be defined independent of said multiplicity of data;
      (iii) irrespective of said visual modeling language used to create said computer-embedded visual model, extracting at least one computationally-executable rule from related functionality, related structure, and/or related behavior between at least two said entities, or sub-components thereof in said computer-embedded visual model, wherein said extracting is based on said at least one real-world process that relates said at least two entities;
      (iv) executing said at least one computationally-executable rule for generating and incorporating new data into said databases, wherein said new data are not previously associated with said multiplicity of data within said databases;
      (v) based on said computer-embedded visual model, discounting a weighting of invalid data in said databases; and
      (vi) upon receiving a query to said databases for a status of said plurality of entities, producing a status report of said at least one state based on said new data, wherein said status report reflects an actual status of said physical environment, and wherein said status report without said new data is incomplete and/or incorrect.

5. The system of claim 4, wherein said multiplicity of data includes data elements linked to said related functionality, said related structure, and/or said related behavior associated with said computer-embedded visual model selected from the group consisting of: identifiers, databases, images, and data.

6. The system of claim 4, wherein said physical environment is selected from the group consisting of: a process, a system, a structure, a routine, a procedure, a technique, an asset, and a method.

7. A non-transitory computer-readable medium, having computer-readable code embodied on the non-transitory computer-readable medium for enhancing data analysis in a hybrid environment, the computer-readable code comprising:
   (a) program code for utilizing a visual modeling language to create a computer-embedded visual model describing a physical environment, wherein said computer-embedded visual model, which can be identified as originating from said visual modeling language and is represented by a graphical representation, includes a plurality of entities having at least one real-world process and at least one real-world object related to each other, which are graphically represented in said computer-embedded visual model, wherein said at least one real-world process is at least one procedural link that changes at least one state of said at least one real-world object;
   (b) program code for, using said computer-embedded visual model, linking a multiplicity of data obtained from databases, wherein said multiplicity of data is detected or measured, from said plurality of entities, in said physical environment, and wherein said computer-embedded visual model can be defined independent of said multiplicity of data;
   (c) program code for, irrespective of said visual modeling language used to create said computer-embedded visual model, extracting at least one computationally-executable rule from related functionality, related structure, and/or related behavior between at least two said entities, or sub-components thereof in said computer-embedded visual model, wherein said extracting is based on said at least one real-world process that relates said at least two entities;
   (d) program code for executing said at least one computationally-executable rule for generating and incorporating new data into said databases, wherein said new data are not previously associated with said multiplicity of data within said databases;

(e) program code for, based on said computer-embedded visual model, discounting a weighting of invalid data in said databases; and (f) program code for, upon receiving a query to said databases for a status of said plurality of entities, producing a status report of said at least one state based on said new data, wherein said status report reflects an actual status of said physical environment, and wherein said status report without said new data is incomplete and/or incorrect.

* * * * *